June 14, 1960     H. M. MAHAN     2,940,314
DIFFERENTIAL PRESSURE TRANSDUCER
Filed April 17, 1958
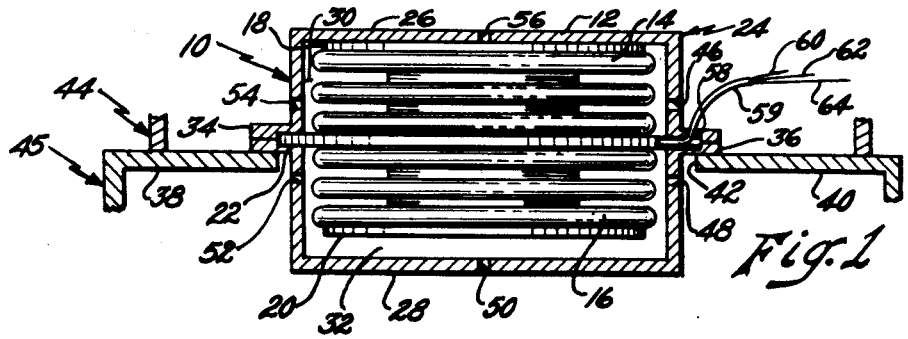
Fig. 1
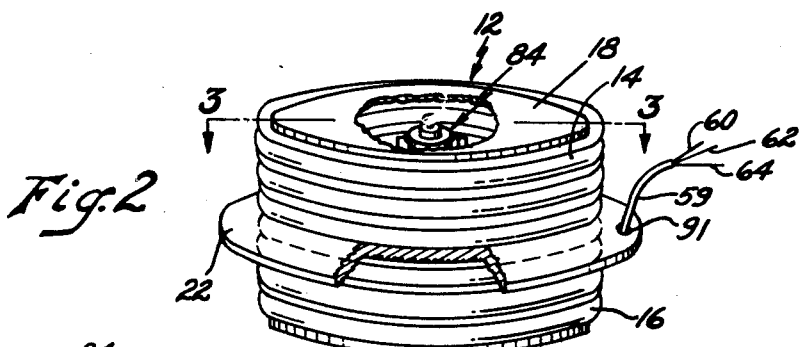
Fig. 2
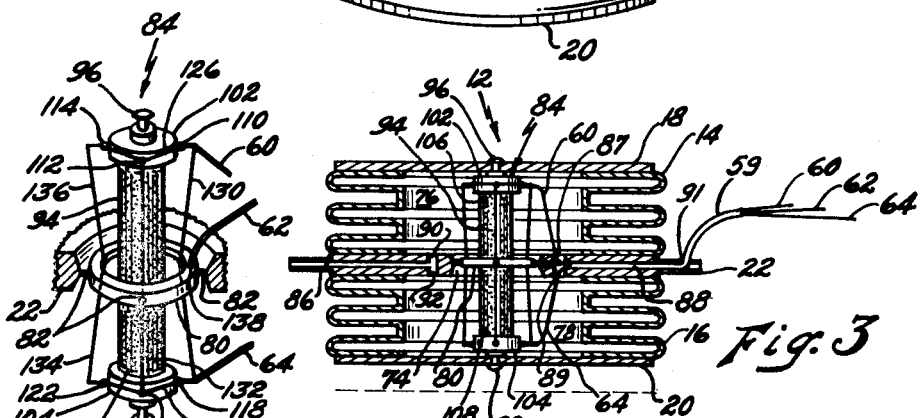
Fig. 3
Fig. 4
Fig. 5
INVENTOR.
H. MERLE MAHAN
BY
ATTORNEYS

United States Patent Office 2,940,314
Patented June 14, 1960

2,940,314

DIFFERENTIAL PRESSURE TRANSDUCER

H. Merle Mahan, Inglewood, Calif., assignor to the United States of America as represented by the Secretary of the Air Force Filed Apr. 17, 1958, Ser. No. 729,219

2 Claims. (Cl. 73—398)

This invention relates to transducers, and more particularly, to a transducer for converting two physical quantities into a corresponding electrical quantity.

The present invention relates to a differential pressure transducer which is responsive to the pressure difference of two mediums impinging thereon for generating an electrical quantity which is a function of the pressure difference of the mediums for measuring said pressure difference.

Differential transducers have found wide acceptance in the art of measuring the pressure of gases, liquids, or a combination of the two, at a particular section of a conduit, or container wherein two different pressures exist. While transducer devices are known and employed for this function, the problem of measuring the pressure at the interface of two pressures is complicated by the configuration of the conduit or container at the section thereof where it is desirable to measure the difference pressure, as for example, where the point at which the difference pressure is to be measured is constricted and particularly narrow. Then again, as is often the case in aircraft fuel supply systems, it is desirable to employ small, compact, and lightweight differential transducers for switching gas tanks when the quantity of fuel in one tank decreases to a predetermined value. Additionally, a differential transducer device may be used for comparing a variable pressure to a constant pressure.

The transducer device of the present invention is not only a compact, lightweight device especially suitable for use in instances where weight is an important consideration, but is also reliable, accurate, and sensitive to small pressure differences.

Accordingly, the present invention involves a transducer device including a pressure-responsive means disposed in separate compartments. An impedance device is disposed in the pressure-responsive means and includes a plurality of parallel-connected resistance elements. These elements are movably connected to sensing means fixed in place and also disposed in the pressure-responsive means. The transducer is mounted at the interface of two mediums, the differential pressure of which is to be measured, in order to have a medium communicate with each of the compartments and to impinge on the pressure-responsive means therein. The pressure-responsive means in said compartments are simultaneously compressible and expansible in response to any difference in pressure between the mediums communicating therewith for displacing the relative position between the impedance device and the sensing means. The impedance change accompanying displacement of the impedance device from the sensing means is a function of the magnitude of the pressure difference between the two mediums. In this manner an electrical quantity, representative of two physical quantities, is derived for subsequent employment in other and associated apparatus dependent, or to be operated in conjunction with, the physical quantities.

These and other objects and features of the present invention will best be understood from the following description taken in conjunction with the accompanying drawings, in which:

Fig. 1 is a cross-sectional front view of a pressure differential transducer with a pressure-responsive device therein;

Fig. 2 is a perspective view of the pressure-responsive device with a portion thereof cut away;

Fig. 3 is a cross-sectional front view of the pressure-responsive device exposing components thereof taken through Fig. 2 along the line 3—3;

Fig. 4 is a perspective view of a resistive device of the pressure-responsive device; and Fig. 5 is a schematic diagram of an electrical circuit equivalent to the transducer device and illustrative of a variety of electrical quantities which can be derived therefrom.

Referring now to Figs. 1 and 2, there is shown a differential pressure transducer 10. A pressure-responsive device 12 may preferably be formed from two substantially identical, flexible bellows 14 and 16, or alternatively, a single larger bellows may be modified to fabricate a device similar to the one formed by two bellows. For the purposes of describing one embodiment of the present invention, a device 12 fabricated from two bellows will be described.

The bellows 14 and 16 are known to persons skilled in the prior art and may be of the type fabricated from a flexible, airtight substance, such as brass, and terminated at one end thereof with an end plate 18 or 20 such as a metal disc. The individual bellows may preferably be cylindrically shaped, and in an embodiment of the invention being described, the bellows had a diameter of 1½ inches and a thickness of ⅜ inch. A single unit, hereafter referred to as "the bellows" unless specific reference is made to the individual parts thereof, may be formed in the following manner.

An annular mounting flange 22 fabricated from flat, rigid material, such as metal, may be suitably connected along opposing surfaces thereof to the open end of each bellows by a solder or adhesive plastic material. The diameter of the flange 22 is preferably larger than that of the individual bellows in order to form a mounting edge for the bellows in a container 24. The bellows is maintained under pressure with an inert gas such as nitrogen to protect the interior thereof from the working fluids which will surround the bellows subsequently. Thus, all connections between the interior and exterior of the bellows should be made airtight in accordance with procedures well known to persons skilled in the prior art. Further details concerning the bellows 14 and 16 and the mounting flange 22 is included subsequently after a description of the mounting of the bellows within the container 24.

Sections 26 and 28 may be fabricated from a rigid material such as a metal or a plastic and are formed interiorly in a manner to accept and support the bellows and to form the container 24 when joined end to end. The outer configuration may be a polygon or cylindrical but the inner configuration of the container must be shaped to include and support the annular mounting flange 22 intermediate the bellows 14 and 16 in a manner to form two separate compartments within the container when the bellows is mounted therein. The bellows 14 is mounted in the upper exterior compartment 30 and the bellows 16 is mounted in the lower exterior compartment 32. To accomplish this manner of mounting the bellows in the container, the sections 26 and 28 preferably have an internal diameter at the bases thereof only slightly larger than that of the annular mounting flange 22. The height of the sections is taller than that of the bellows 14 and 16 and the overall height is governed by the selectable displacement of the bellows in the container. The open ends of the sections 26 and 28 are preferably terminated with a mounting lip 34 or 36, so that the container may be formed by joining the sections end to end along the mounting lips. Additionally, the base of each section in the vicinity of the mounting lips 34 and 36 is suitably grooved around the periphery thereof to accept and support the end of the annular mounting flange 22 of the bellows when the bellows is mounted in the container. A suitable solder or adhesive may be employed for securing the mounting flange 22 to the sections 26 and 28 for supporting the bellows in the container and for joining the sections to form the container. When the bellows is at rest, end plates 18 and 20 are substantially equidistantly disposed from the ends of the sections 26 and 28. The container can be placed at the interface of two mediums, the differential pressure of which is to be measured, by resting the mounting lip 34 or 36 across surfaces 38 and 40 adjacent an opening 42. The surfaces may be, for example, a common wall for two containers 44 and 45, or two conduits. A plurality of openings 46 through 56 are dispersed symmetrically in the sections 26 and 28 to admit the mediums available at the opening 42 to have a medium contact and impinge on bellows 14 and 16 in the separate compartments 30 and 32 of the container.

As shown in Fig. 1, the pressure in the compartment 32 is greater than the pressure in compartment 30 and the end plate 18 has moved to a topmost position. In the embodiment of the invention being described the maximum movement of the bellows was one-tenth inch. This is indicative of the extreme sensitivity attainable with the device of the present invention. The mediums may be gaseous, liquid, or a combination of the two, and the only apparent limitation on use of the transducer in any kind of medium is one that would naturally be expected, that is, the corrosive nature of the medium. In some instances, where it is desirable to place the transducer in a corrosive medium the material for fabricating the transducer can be selected to avoid any interference therefrom.

An opening 58 in the section 26 may be used to bring an insulated cable 59 with three wire leads 60, 62, and 64 carried in the mounting flange 22 from the interior of the bellows to the exterior of the contaner 24. Other methods for bringing said wire leads out will be equally suitable and will suggest themselves to persons skilled in the prior art.

Referring now to Figs. 3 and 4, there is shown the pressure responsive device and the components comprising the device. The mounting flange 22 is secured to the bellows 14 and 16 and one method of achieving a good bond thereat would involve having a suitable flare at the ends of the bellows 14 and 16 for securing said bellows to the upper and lower surfaces of the mounting flange 22. A central opening 74 is provided in the mounting flange 22 so that upper and lower inner compartments 76 and 78 of the bellows 14 and 16 communicate with each other. The opening 74 should be of sufficient diameter to enable a sensing element 80 to be insulatedly secured within the opening 74. The sensing element 80 may conveniently be an annular metallic ring and may be secured to the end plates at several tie points 82, and preferably at four points. The ring should have a diameter of sufficient size to include and embrace a resistive device 84 therein, as will be described subsequently. A suitable adhesive medium may be employed not only to secured the ring but also to provide the necessary insulation between the ring and the mounting flange 22.

Conduits 86 and 88 may conveniently be drilled in a horizotal plane along a portion of a diameter of said mounting flange 22. The conduit 88 should preferably coincide with the opening 58 in the section 26, and its size should preferably be able to accommodate the three wire leads 60, 62, and 64. Openings 87, 89, and 91 may be drilled perpendicular to the conduit 86 at the ends thereof to intercept said conduit 88 to enable said wire leads to be inserted and carried therein, as will be described more fully subsequently. The conduit 86 should preferably extend from the end of the mounting flange 22. Openings 90 and 92 may be drilled in a transverse plane to the conduit 86 for dispersing a gaseous or liquid medium under pressure into the inner compartments of the bellows. An inert gas such as nitrogen may be advantageously employed to add some rigidity to the bellows and to prevent deterioration of components disposed therein. The gaseous medium may be fed into the bellows by connecting the source to the conduit 86, and then, a suitable sealant or plug (not shown) may be used to maintain the gaseous medium in the bellows. As mentioned previously, the connections between the interior and exterior of the bellows should be made airtight.

The resistive device 84 is included within the sensing element 80 and the opening 74 provided in the mounting flange 22. The device is secured on a rigid member 94 (Fig. 3) which is secured between the end plates 18 and 20 by rivets 96 and 98. This member provides rigidity to the bellows and prevents any change in the axial length of the bellows. It may conveniently be fabricated from cylindrical metallic stock, but a coating of an insulating material 100 should be applied thereto to render it electrically non-conductive. An insulating washer 102 or 104, fabricated from an electrically non-conductive material, such as a plastic, is secured to each end of the member 94 and rests on a shoulder 106 or 108 provided therefor.

Referring now to Fig. 4 particularly, four terminals 110, 112, 114 (shown), and 116 (not shown) are disposed and equally displaced around the periphery of the washer 102. Four terminals 118, 120, 122 (shown), and 124 (not shown) are disposed around the periphery of the washer 104 in a manner to have them diametrically opposite to the terminals on the washer 102. A wire lead 126 is attached to the four terminals 110, 112, 114, and 116 to have them all at the same electrically potential subsequently. Similarly, a wire lead 128 is attached to the four terminsla 118, 120, 122, and 124.

Four resistance wires or elements 130, 132, 134 (shown), and 136 (not shown) are secured between diametrically opposing terminals secured to washers 102 and 104 so as to run vertically and parallel to the rigid member 94. The wires may be fabricated from any of the known materials used for this purpose, as for example, nickel wire, having a selectable resistance rating. The inner surface of the sensing element 80 embraces and is in contact with each of the resistance wires. A contact 138 on the sensing element may be used to connect the sensing element to the wire lead 62. Wire leads 60 and 64 are connected to wire leads 126 and 128, respectively, forming the equivalent electrical circuit shown in Fig. 5. Parallel-connected potentiometers 140, 142, 144, and 146 are electrically equivalent to resistance wires 130, 132, 134, and 136. Parallel-connected and ganged wiper arms 148, 150, 152, and 154 are electrically equivalent to the sensing element 80 in contact with said resistance wires. The dashed line 155 indicates that the wiper arms are ganged. Terminals 156 and 158 are electrically equivalent to the electrical circuit formed by the connection of the wire leads 60 and 126 and 64 and 128, while terminal 160 is electrically equivalent to the connection of the wire lead 62 to the sensing element 80.

As aforementioned, the transducer 10 is mounted at the interface of two mediums, one of which may be atmospheric air, in order to obtain any electrical quantity which is representative of a function of the pressure difference between the two mediums.

An electrical quantity is generated by the response of the bellows 14 and 16 in the exterior compartments 30 and 32 to any pressure difference of the mediums in said compartments communicating and impinging thereon. Assuming a pressure difference to exist, for purposes of explanation, the inner compartments 76 and 78 will simultaneously be compressed and expanded equally due to this pressure difference since the bellows is fixedly mounted in its container along the axis of the sensing element 80. This displacement of the bellows occurs by overcoming the rigidity forces previously mentioned and referred to in the inherent structure of the bellows, and consequently, the resistance elements 130, 132, 134, and 136 are displaced from the points of original contact with the sensing element 80, which is also fixed in place. More briefly, the bellows stabilizes its position and configuration about the mounting flange 22 under the influence of a pressure difference thereon, and the displacement of the impedance device 84 results in a proportional change in the impedance between the sensing element 80 and a terminal of the elements included therein. As shown best in Fig. 4, the central opening 74 in the mounting flange 22 has beveled edges to prevent the resistance wires from contacting said mounting flange.

The parallel-connected impedance elements of the device 84 enables the transducer to be especially sensitive to pressure differences, and also affords an aspect of accuracy not normally accompanying devices employing a single-element, impedance device. In this regard, the total impedance of the device 84 is a function of the electrical impedance of all the elements thereof, and similarly, the change of impedance experienced with a difference pressure, is also a function of the electrical impedance of all the elements between the sensing element and a reference point. Thus, minute changes in pressure can be detected, and the overall impedance is insensitive to temperature changes.

The electrical quantity output of the transducer can be utilized in many ways. If an impedance change dependent upon the difference in pressure is desirable, an ohmmeter 162 can be connected between the terminal 160 and the terminal 158 or 156 to measure the pressure difference. Alternatively, the impedance of the device available across terminals 156 and 158 and the impedance across terminals 160 and 156 or 158 may be incorporated into a conventional Wheatstone bridge circuit, as legs thereof, for obtaining an unbalance therein dependent upon pressure differences as is well known to persons skilled in the prior art.

Another alternative immediately suggestible to persons skilled in the prior art, is to apply a current from a direct or alternating current source 164 across the terminals 156 and 158 and to measure the change of voltage occurring between terminals 160 and 158 or 156, in which case a voltmeter (not shown) can be substituted for the ohmmeter 160 to record the change of voltage as a function of the pressure difference between the two mediums. Other electrical connections between the transducer and associated apparatus to utilize the electrical quantity output thereof for control purposes are known to persons skilled in the prior art, and no attempt is made to delineate with particularity the application thereof.

Having described an embodiment of a transducer and the principles embodied therein for converting two physical quantities to an electrical quantity, having a magnitude dependent upon the physical quantities, it is desired that the present invention not be limited to the particular embodiment used to describe the principles of the invention. The description of this device and the operating principles thereof will be suggestive to variations without departing from the spirit and scope of the present invention. Accordingly, it is intended that the present invention be interpreted in a manner commensurate with the appended claims.

What is claimed is:

1. In combination, a differential pressure transducer including a bellows, sensing means disposed in said bellows, an impedance device perpendicularly disposed within and movable contacting said sensing means, means for connecting said impedance device to said bellows to provide rigidity to said bellows, said impedance device including a plurality of parallel-connected resistance elements, first and second compartments formed around and including a portion of said bellows, openings in said compartments, said transducer being mounted between two mediums to have a medium communicate with each of said compartments through said openings and to impinge on the portion of the bellows therein, said impedance device being displaced from said sensing means a distance proportional to the pressure difference between said mediums impinging on said bellows; and means connected to said resistive elements and said sensing means for measuring the change of resistance occurring with displacement of said impedance device.

2. In combination, a differential pressure transducer including a bellows, sensing device disposed in said bellows, means for connecting said sensing device to said bellows to provide rigidity to said bellows, said sensing device including a plurality of parallel-connected resistance elements, first and second compartments formed around and including a portion of said bellows, openings in said compartments, said transducer being mounted between two mediums to have a medium communicate with each of said compartments through said openings and to impinge on the portion of the bellows therein, said sensing device being displaced from said sensing means a distance proportional to the pressure difference between said mediums impinging on said bellows, and means connected to said resistive elements and said sensing means for measuring the change of resistance occurring with displacement of said sensing device.

References Cited in the file of this patent

UNITED STATES PATENTS

| | | |
|---|---|---|
| 2,466,071 | Barnes et al. | Apr. 5, 1949 |
| 2,564,416 | Wildhack | Aug. 14, 1951 |
| 2,789,190 | Statham | Apr. 16, 1957 |